United States Patent
Motoya et al.

(10) Patent No.: US 9,753,275 B2
(45) Date of Patent: Sep. 5, 2017

(54) ILLUMINATION APPARATUS

(71) Applicant: PANASONIC INTELLECTUAL PROPERTY MANAGEMENT CO., LTD., Osaka (JP)

(72) Inventors: Atsushi Motoya, Shiga (JP); Kentaro Yamauchi, Osaka (JP); Ryo Kawamura, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 161 days.

(21) Appl. No.: 14/532,390

(22) Filed: Nov. 4, 2014

(65) Prior Publication Data
US 2015/0124431 A1    May 7, 2015

(30) Foreign Application Priority Data
Nov. 5, 2013 (JP) .................... 2013-229769

(51) Int. Cl.
*G02B 26/00* (2006.01)
*H04N 9/31* (2006.01)
(Continued)

(52) U.S. Cl.
CPC .......... *G02B 26/008* (2013.01); *G02B 27/09* (2013.01); *G02B 27/1026* (2013.01);
(Continued)

(58) Field of Classification Search
None
See application file for complete search history.

(56) References Cited

U.S. PATENT DOCUMENTS 6,259,103 B1 * 7/2001 Pressnall ............ G01J 1/4257
250/330
7,404,652 B2 * 7/2008 Ng ........................ F21K 9/00
257/E25.02
(Continued)

FOREIGN PATENT DOCUMENTS

EP    2787390 A1    10/2014
EP    2793078 A1    10/2014
(Continued)

OTHER PUBLICATIONS

U.S. Appl. No. 14/528,329 to Kawamura et al., filed Oct. 30, 2014.

*Primary Examiner* — Sharon Payne
(74) *Attorney, Agent, or Firm* — Greenblum & Bernstein, P.L.C.

(57) ABSTRACT

An illumination apparatus includes a first unit, a second unit, and a third unit. The first unit includes an excitation light source that produces excitation light. The second unit includes a light-for-illumination phosphor. The light-for-illumination phosphor produces and outputs light for illumination when the light-for-illumination phosphor receives excitation light. Furthermore, the second unit produces and outputs light for projection. The light for illumination and the light for projection are outputted in a time division manner. The third unit includes a light shaping member. The third unit shapes the light for illumination by the light shaping member and guides the shaped light for illumination to the outside as illumination light, and shapes the light for projection by the light shaping member and guides the shaped light for projection to the outside as projection light.

19 Claims, 7 Drawing Sheets

(51) Int. Cl.
  *G03B 21/20* (2006.01)
  *G02B 27/09* (2006.01)
  *G03B 33/08* (2006.01)
  *G02B 27/10* (2006.01)

(52) U.S. Cl.
  CPC ......... *G03B 21/204* (2013.01); *G03B 21/208* (2013.01); *G03B 21/2013* (2013.01); *G03B 33/08* (2013.01); *H04N 9/3114* (2013.01); *H04N 9/3158* (2013.01); *G03B 21/2066* (2013.01)

(56) References Cited

U.S. PATENT DOCUMENTS

| | | | |
|---|---|---|---|
| 2003/0142241 A1* | 7/2003 | Allen | H04N 9/3114 348/742 |
| 2005/0280911 A1* | 12/2005 | Huang | G02B 26/008 359/891 |
| 2011/0116253 A1 | 5/2011 | Sugiyama | |
| 2011/0194038 A1 | 8/2011 | Kimura et al. | |
| 2014/0375959 A1 | 12/2014 | Yang et al. | |

FOREIGN PATENT DOCUMENTS

| | | |
|---|---|---|
| JP | 2009-199854 | 9/2009 |
| JP | 2011-108502 A | 6/2011 |
| JP | 2011-164173 A | 8/2011 |
| JP | 2012-108337 A | 6/2012 |
| WO | 2013/017111 A1 | 2/2013 |
| WO | 2013/078862 A1 | 6/2013 |
| WO | 2013/091384 A1 | 6/2013 |

\* cited by examiner

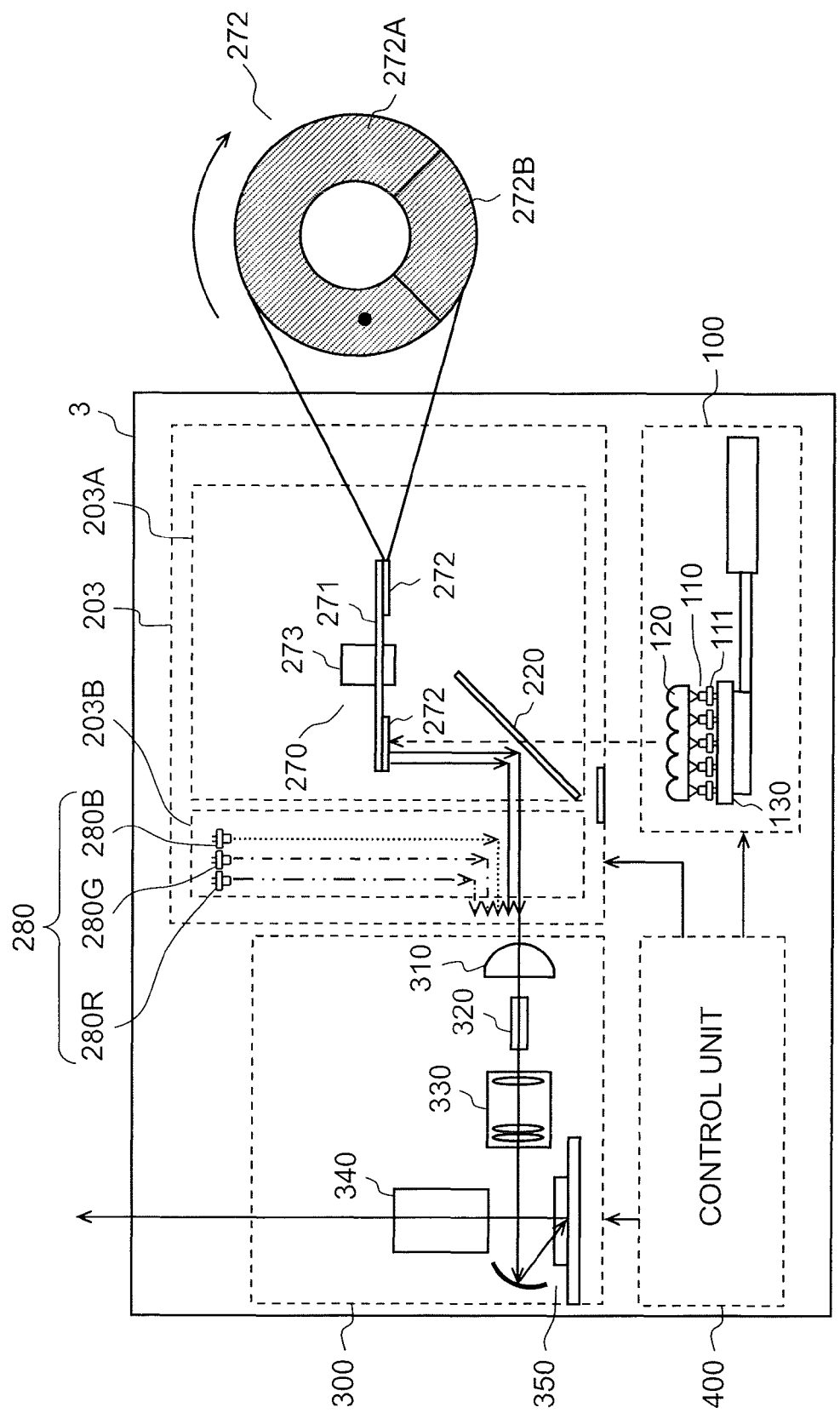

ILLUMINATION APPARATUS

BACKGROUND OF THE INVENTION

1. Field of the Invention

The present disclosure relates to illumination apparatuses.

2. Description of the Related Arts

In recent years, progress has been made in research and development of illumination apparatuses in which semiconductor light emitting elements, such as LEDs (Light Emitting Diodes) are used as excitation light sources.

Such an illumination apparatus has a blue LED (excitation light source) and a yellow phosphor to produce, for example, white illumination light (white light). Blue light of the blue LED serves as excitation light to excite the yellow phosphor that thereby performs fluorescence emission to emit yellow light. The blue light emitted from the blue LED and the yellow light emitted from the yellow phosphor are mixed together to be white light to be outputted.

Furthermore, for example, in Japanese unexamined patent application publication No. 2009-199854, a projector capable of diverting projection light to illumination light is disclosed. More specifically, a position of a lens is shifted to allow the projection light to pass through the lens. In this way, the projection light is diverted to spotlighting illumination light.

SUMMARY OF THE INVENTION

An illumination apparatus according to the present disclosure includes a first unit, a second unit, and a third unit. The first unit includes an excitation light source that produces excitation light. The second unit includes a light-for-illumination phosphor. The light-for-illumination phosphor produces and outputs light for illumination when the light-for-illumination phosphor receives the excitation light. Furthermore, the second unit produces and outputs light for projection. The light for illumination and the light for projection are outputted in a time division manner. The third unit includes a light shaping member. The third unit shapes the light for illumination by the light shaping member and guides the shaped light for illumination to the outside as illumination light, and shapes the light for projection by the light shaping member and guides the shaped light for projection to the outside as projection light.

The above structure makes it possible to output illumination light with high color rendering properties and desired projection light in the time division manner.

BRIEF DESCRIPTION OF DRAWINGS

FIG. 7 is a diagram illustrating a structure of an illumination apparatus according to a third embodiment.

DETAILED DESCRIPTION OF THE PREFERRED EMBODIMENTS

Figure 1:
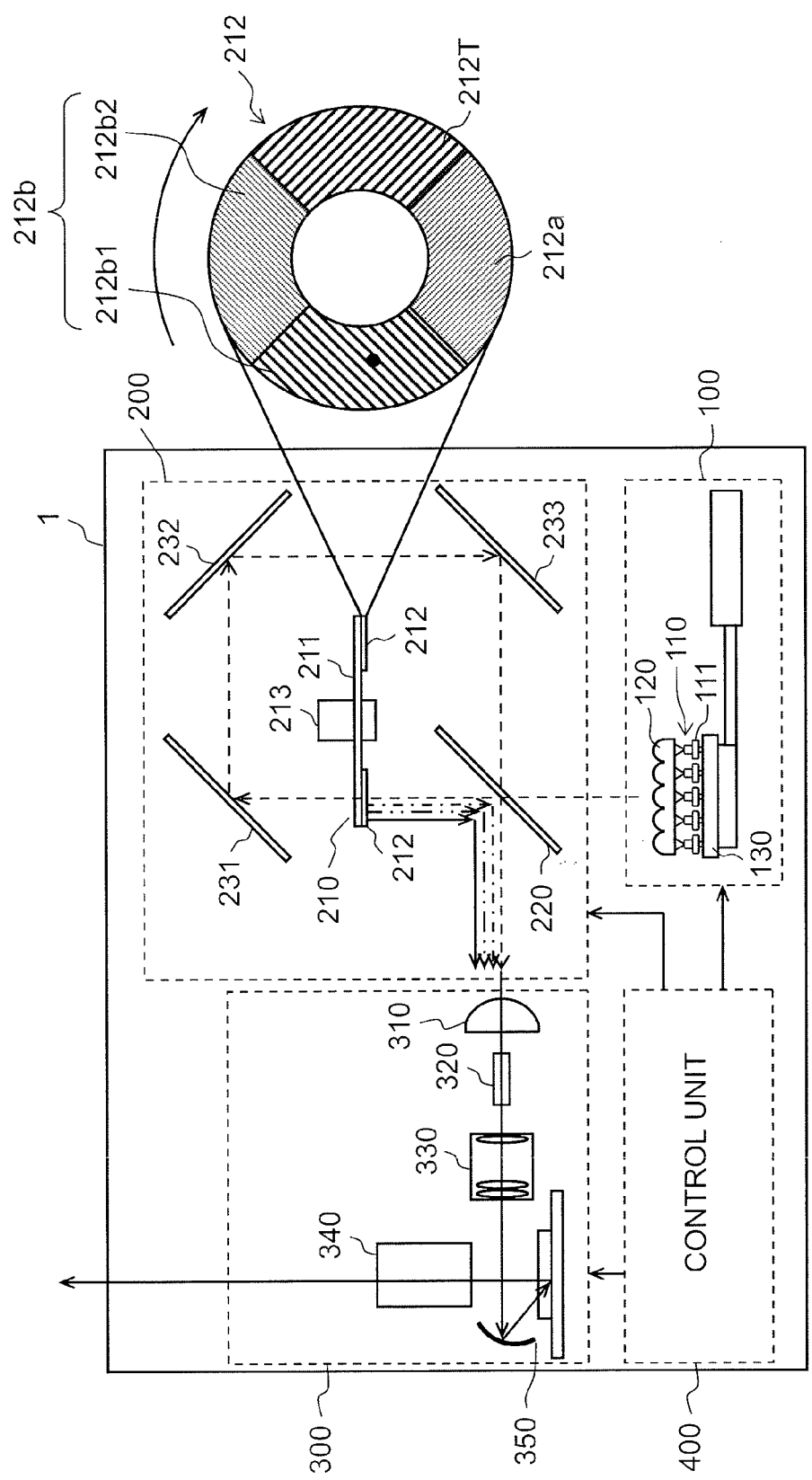
FIG. 1 is a diagram illustrating a structure of an illumination apparatus according to a first embodiment.

Prior to describing the preferred embodiments, problems in the related arts are explained. In general, since illumination light and projection light have different aims, different light spectra are required for the illumination light and the projection light. For example, illumination light is aimed at improving appearance of an illuminated object, such as color rendering properties. Illumination light is therefore generally required to have a broad spectrum. In contrast, projection light is aimed at improving a color reproduction capability (image quality). Projection light is therefore generally required to have a spectrum with a sharp peak wavelength.

However, the projector disclosed in Japanese unexamined patent application publication No. 2009-199854 diverts projection light to illumination light. Therefore, the light emitted from the projector has low color rendering properties.

On the other hand, conventional illumination apparatuses have difficulties in outputting desired projection light in addition to illumination light. For example, it is difficult for the conventional illumination apparatuses to perform displaying of desired color image (projection light) in addition to illuminating with white light (illumination light).

The following describes the embodiments of the present disclosure with reference to the Drawings. Any of the embodiments described below is a preferred example of the present disclosure. Therefore, numerical values, shapes, substances, structural elements, arrangement positions and connection configuration of the structural elements, steps, the order of the steps, and the like described in the following embodiments are merely examples, and are not intended to limit the present disclosure. It should be noted that each of the figures in the Drawings is a schematic diagram and not an exact illustration. It should also be noted that the same reference marks in the figures are assigned to substantially identical structural elements, so that repeated description of the identical structural elements is not given or is simplified.

First Embodiment

[Structure of Illumination Apparatus]

First, a structure of illumination apparatus 1 according to the first embodiment of the present disclosure is described with reference to FIG. 1. FIG. 1 is a diagram illustrating the structure of illumination apparatus 1.

Illumination apparatus 1 includes first unit 100, second unit 200, and third unit (optical unit) 300. Illumination apparatus 1 further includes control unit 400 that controls first unit 100, second unit 200, and third unit 300.

First unit 100 is an excitation light production unit that produces excitation light. The excitation light produced in first unit 100 is outputted toward second unit 200.

First unit 100 includes: light emitting module 110 that emits the excitation light; collimating lens 120; and heat sink 130.

Light emitting module 110 includes semiconductor light emitting elements 111 which serves as an excitation light source to emit monochromatic light. Semiconductor light emitting elements 111 are, for example, semiconductor lasers or LEDs, and are driven by current to emit light of a predetermined color (wavelength). According to the present embodiment, as an example, semiconductor lasers that emit blue light are used as semiconductor light emitting elements 111. Control unit 400 controls the light emission of semiconductor light emitting elements 111. Although first unit 100 includes the plurality of semiconductor light emitting elements 111, it is also possible to provide single semiconductor light emitting element 111 in first unit 100. The excitation light emitted from semiconductor light emitting elements 111 is incident on an light-for-illumination phosphor and light-for-projection phosphors in a time division manner. The light-for-illumination phosphor and the light-for-projection phosphors will be described later.

Collimating lens 120 is provided in front of semiconductor light emitting elements 111. Therefore, for example, lights emitted from semiconductor light emitting elements 111 are collimated by collimating lens 120 to be collected together to be single straight light. Collimating lens 120 is a collimating lens array including lens cells each corresponding to a corresponding one of semiconductor light emitting elements 111.

Semiconductor light emitting elements 111 are provided to heat sink 130. Heat sink 130 is, for example, a base made of metal or the like.

Second unit 200 is a light-for-projection/light-for-illumination production unit that produces light for projection and light for illumination, and outputs the light for projection and the light for illumination in the time division manner. Second unit 200 includes fluorescence emitting member 210, dichroic mirror 220, first reflective mirror 231, second reflective mirror 232, and third reflective mirror 233.

Fluorescence emitting member 210 is rotatable. More specifically, fluorescence emitting member 210 is a phosphor wheel (rotating wheel), and includes rotating plate 211 having a doughnut disc shape (torus shape) and fluorescent emitting part 212 provided to rotating plate 211. Fluorescence emitting member 210 is rotated by motor 213.

Rotating plate 211 is, for example, a transparent substrate. Rotating plate 211 is rotated at a predetermined frequency by motor 213. Motor 213 is driven according to drive control signal issued from control unit 400. In other words, the predetermined frequency of rotations of rotating plate 211 is controlled by control unit 400.

Fluorescence emitting member 210 is divided to four regions in a rotation direction of rotating plate 211. Fluorescent emitting part 212 is provided on one surface of rotating plate 211. Fluorescent emitting part 212 includes phosphors each of which performs fluorescence emission when the phosphor receives the excitation light from first unit 100. In fluorescence emitting member 210, fluorescent emitting part 212 includes a light-for-illumination phosphor and light-for-projection phosphors. The light-for-illumination phosphor produces light for illumination by fluorescence emission caused by the excitation light provided from first unit 100. Each of the light-for-projection phosphors produces light for projection by fluorescence emission caused by the excitation light provided from first unit 100. The light-for-illumination phosphor and the light-for-projection phosphors are coated on, for example, rotating plate 211.

Fluorescent emitting part 212 is divided to: light-for-illumination emitting region 212a provided with the light-for-illumination phosphor; and light-for-projection emitting region 212b provided with the light-for-projection phosphors. Light-for-illumination emitting region 212a and light-for-projection emitting region 212b are allocated to respective predetermined regions which are obtained by dividing rotating plate 211 in the rotation direction. In other words, the light-for-illumination phosphor and the light-for-projection phosphors are respectively provided on different positions on rotating plate 211.

It is possible to choose a substance for the light-for-illumination phosphor in light-for-illumination emitting region 212a according to the excitation light of first unit 100 so as to produce illumination light of a desired color. In the case of illumination apparatus 1, the excitation light is blue light. Therefore, if white illumination light (white light), for example, is to be produced, an YAG (Yttrium-Aluminum-Garnet) yellow phosphor may be used as an example. More specifically, in light-for-illumination emitting region 212a, a phosphor-including member, which comprises a transparent substance including the light-for-illumination phosphor, is provided to rotating plate 211.

With this structure, a part of the blue light (excitation light) provided from first unit 100 is wavelength-converted by the yellow phosphor into yellow light (a part of the light for illumination). This yellow light is mixed with blue light (the other part of the light for illumination) which is not absorbed into the yellow phosphor, thereby resulting in synthetic light (white light). As a result, the white light is emitted from light-for-illumination emitting region 212a as the light for illumination. As described above, the light for illumination is produced when the excitation light causes fluorescence emission of the phosphor.

Light-for-projection emitting region 212b is further divided to a plurality of regions each of which emits fluorescence light of a predetermined corresponding color (wavelength) as light for projection. In illumination apparatus 1, light-for-projection emitting region 212b consists of: green fluorescence emitting region 212b1 provided with a green phosphor; and red fluorescence emitting region 212b2 provided with a red phosphor. Therefore, the blue light (excitation light) provided from first unit 100 excites the green phosphor in green fluorescence emitting region 212b1 to cause the green phosphor to perform fluorescence emission to emit green monochromatic light as light for projection. The blue light (excitation light) provided from first unit 100 excites the red phosphor in red fluorescence emitting region 212b2 to cause the red phosphor to perform fluorescence emission to emit red monochromatic light as light for projection.

Rotating plate 211 further includes transmission region 212T through which the excitation light passes. More specifically, rotating plate 211 includes: light-for-illumination emitting region 212a provided with the light-for-illumination phosphor; light-for-projection emitting region 212b provided with the light-for-projection phosphors; and transmission region 212T through which the excitation light passes. Transmission region 212T as well as light-for-illumination emitting region 212a and light-for-projection emitting region 212b is allocated to a predetermined one of the divided regions of rotating plate 211. The blue light that is the excitation light passes through transmission region 212T. Transmission region 212T may be a transparent region or a light diffusion region as long as light passes through the region.

As described above, light-for-illumination emitting region 212a, transmission region 212T, green fluorescence emitting region 212b1, and red fluorescence emitting region 212b2 are separate from one another, being allocated to the respective four regions which are obtained by dividing rotating plate 211 in the rotation direction of rotating plate 211.

It should be noted that the divided regions may be obtained by dividing rotating plate 211 equally (for example, into quarters) in the rotation direction of rotating plate 211, or by dividing rotating plate 211 unequally as needed to achieve desired projection and desired illumination effects.

Dichroic mirror 220 has properties of allowing the light (excitation light) provided from first unit 100 to pass through dichroic mirror 220, and also reflecting any light having a wavelength longer than a wavelength of the light (excitation light) provided from first unit 100.

Since the light (excitation light) provided from first unit 100 is blue light, dichroic mirror 220 allows the blue light (blue band light) to pass through dichroic mirror 220 but reflects any light having a wavelength longer than the wavelength of the blue light.

First reflective mirror 231 reflects the excitation light having passed through transmission region 212T of fluorescence emitting member 210, thereby guiding the excitation light to second reflective mirror 232. Second reflective mirror 232 reflects the excitation light reflected on first reflective mirror 231, thereby guiding the excitation light to third reflective mirror 233. Third reflective mirror 233 reflects the excitation light reflected on second reflective mirror 232, thereby guiding the excitation light to third unit 300 through dichroic mirror 220.

Since the excitation light provided from first unit 100 is blue light, the blue light having passed through fluorescence emitting member 210 is reflected sequentially on first reflective mirror 231, second reflective mirror 232, and third reflective mirror 233, and then passes through dichroic mirror 220 to be eventually guided to third unit 300.

In second unit 200 having the above-described structure, the light for illumination (white light) is produced in light-for-illumination emitting region 212a of fluorescence emitting member 210, by the excitation light (blue light) provided from first unit 100. The produced light for illumination is emitted toward dichroic mirror 220, and then reflected on dichroic mirror 220 to be guided to third unit 300.

The light for illumination is reflected on dichroic mirror 220 to be guided to third unit 300. Among the light for illumination, a part of the blue wavelength band light passes through dichroic mirror 220. In order to address this, the blue light which is provided from first unit 100 or the blue light which is provided from first unit 100 and then passes through transmission region 212T of fluorescence emitting member 210 can compensate the blue wavelength band light in the light for illumination. The second and third embodiments and the variations have the same problem solved by the same compensation method. It should be noted that the above problem can be easily solved if the excitation light is not blue light but ultraviolet light (UV light), which will be described later.

Light-for-projection emitting region 212b of fluorescence emitting member 210 consists of green fluorescence emitting region 212b1 and red fluorescence emitting region 212b2. In light-for-projection emitting region 212b, the excitation light provided from first unit 100 causes fluorescence emission of a corresponding one of the light-for-projection phosphors to produce light for projection. In illumination apparatus 1, the light-for-projection phosphors include: the green phosphor that produces green light as light for projection; and the red phosphor that produces red light as light for projection. The produced light for projection is emitted toward dichroic mirror 220, and then reflected on dichroic mirror 220 to be guided to third unit 300.

As described above, in second unit 200, motor 213 rotates rotating plate 211 thereby rotating fluorescent emitting part 212. Therefore, the light for projection and the light for illumination, which are produced by fluorescent emitting part 212, are outputted from fluorescence emitting member 210 in the time division manner, and guided sequentially to third unit 300.

Third unit 300 is an optical unit that guides the light for illumination produced in second unit 200 to the outside as predetermined illumination light, and guides the light for projection produced in second unit 200 to the outside as predetermined projection light. The projection light expresses, for example, a moving picture, a still picture, characters, or the like. The projection light is displayed on a predetermined incident region (display region) outside illumination apparatus 1. The illumination light is, for example, light of a predetermined color to brighten a certain place. The illumination light is incident on a predetermined incident region outside illumination apparatus 1.

Third unit 300 serves as a light shaping member, and includes condenser lens 310, rod integrator 320, lens group 330, projection lens 340, and display element 350.

Condenser lens 310 collects the light for illumination, which is provided from second unit 200 and guided to third unit 300, onto an incident end face of rod integrator 320. Furthermore, condenser lens 310 collects the light for projection, which is provided from second unit 200 and guided to third unit 300, onto the incident end face of rod integrator 320.

Rod integrator 320 receives, on the incident end face, the light for illumination collected by condenser lens 310. Furthermore, rod integrator 320 receives, on the incident end face, the light for projection collected by condenser lens 310. Rod integrator 320 causes luminance distribution of the received light to be homogeneous, and outputs the resulting light. Rod integrator 320 is, for example, a square pillar. The light incident on rod integrator 320 repeats total reflection in the medium of the square pillar to have homogeneous luminance distribution, and is then outputted.

Lens group 330 causes the light for illumination provided from rod integrator 320, to be incident on display element 350. Furthermore, lens group 330 causes the light for projection provided from rod integrator 320, to be incident on display element 350. Lens group 330 is a lens unit including a plurality of lenses. For example, lens group 330 includes a condenser lens, a relay lens, and the like.

Projection lens 340 projects the projection light provided from display element 350, to the outside of illumination apparatus 1. Furthermore, project lens 340 projects the illumination light provided from display element 350, to the outside of illumination apparatus 1. Projection lens 340 is a projection lens group (projection unit) including one or more lenses. For example, projection lens 340 includes a biconvex lens, a diaphragm, a plano-concave lens, and the like.

Display element 350 controls the light for projection provided from lens group 330 to be outputted as projection light. Furthermore, display element 350 controls the light for illumination provided from lens group 330 to be outputted as illumination light. For example, display element 350 outputs the light for projection (each of red light, green light, and blue light) as the projection light (image), and outputs the light for illumination (white light) as the illumination light (white light) having a predetermined shape.

As described above, illumination apparatus 1 includes first unit 100, second unit 200, and third unit 300. Illumination apparatus 1 further includes control unit 400 that controls first unit 100, second unit 200, and third unit 300. First unit 100 is an excitation light source that produces excitation light. Second unit 200 includes a light-for-illumination phosphor. When the light-for-illumination phosphor receives the excitation light, the light-for-illumination phosphor produces light for illumination and outputs the light for illumination. Second unit 200 further produces light for projection and outputs the light for projection. Here, second unit 200 outputs the light for illumination and the light for projection in the time division manner. Third unit 300 includes a light shaping member. Third unit 300 shapes the light for illumination by the light shaping member, and guides the shaped light for illumination as illumination light to the outside. Third unit 300 further shapes the light for projection by the light shaping member, and guides the shaped light for projection as projection light to the outside.

Since the projection light and the illumination light are outputted from the same display element 350, a maximum incident region on which the projection light is incident is essentially equal to a maximum incident region on which the illumination light is incident. Within the same incident region, the projection light and the illumination light are incident in the time division manner.

Display element 350 is a DMD (Digital Mirror Device) serving as an image device. The DMD includes a plurality of micromirrors each corresponding to a different one of pixels in each of the projection light (image) and the illumination light. Each of the micromirrors is movable and basically corresponds to one pixel.

By changing an angle of each of the micromirrors, the DMD is capable of switching whether or not to reflect target light among the light for projection (red light, green light, and blue light) and the light for illumination, which is provided from lens group 330, to be guided to projection lens 340. More specifically, by selectively rotating each of the micromirrors, the target light among the light for projection (red light, green light, and blue light) and the light for illumination is selectively reflected to be guided to projection lens 340. Here, for example, if all of the pixels are to be used for illumination light, all of the micromirrors are opened. Furthermore, an inclination of each of the micromirrors is controlled according to control signal issued from control unit 400. It should be noted that control unit 400 controls the operation of display element 350 (DMD) and the rotation of fluorescence emitting member 210 (phosphor wheel) to be performed in synchronization with each other.

It should also be noted that display element 350 is not limited to the reflective display element, such as the DMD, but may be a light distribution control element such as a transmissive display element that is a liquid crystal display element or the like, as long as light distribution can be controlled.

Figure 2:
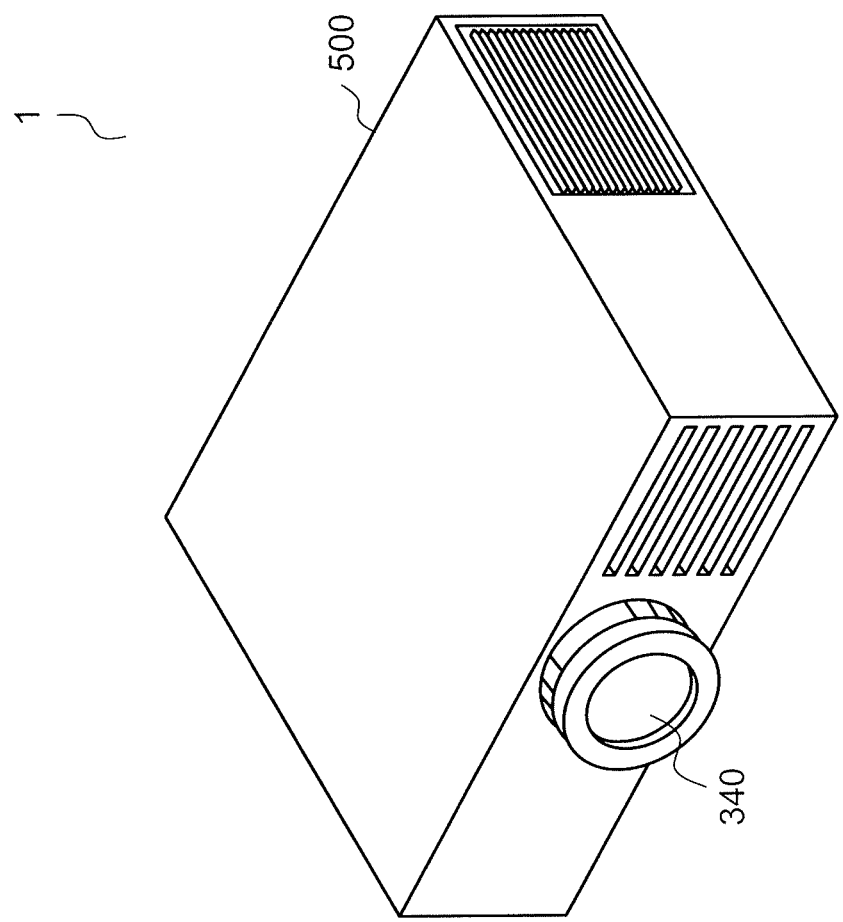
FIG. 2 is an external perspective view of the illumination apparatus according to the first embodiment.

In illumination apparatus 1 having the above structure, first unit 100, second unit 200, third unit 300, and control unit 400 may be accommodated in, for example, housing 500 as illustrated in FIG. 2. FIG. 2 is an external perspective view of illumination apparatus 1.

[Operations of Illumination Apparatus]

Next, operations of illumination apparatus 1 are described. The following describes the case where semiconductor light emitting elements 111 emit blue light.

First unit 100 outputs blue light as excitation light. More specifically, the blue lights emitted from semiconductor light emitting elements 111 are collimated by collimating lens 120 to be straight light and then outputted from first unit 100. The blue light outputted from first unit 100 is provided to second unit 200.

The blue light outputted to second unit 200 passes through dichroic mirror 220 and is then incident on fluorescence emitting member 210. As fluorescence emitting member 210 is rotating at the predetermined frequency, the blue light provided from first unit 100 is incident, in a time division manner, on light-for-illumination emitting region 212a, green fluorescence emitting region 212b1, red fluorescence emitting region 212b2, and transmission region 212T of fluorescence emitting member 210.

Here, if the blue light provided from first unit 100 is incident on light-for-illumination emitting region 212a, the blue light is converted to yellow light by the yellow phosphor in light-for-illumination emitting region 212a. White light (synthetic light) that is color mixture of the blue light and the yellow light is emitted as light for illumination from light-for-illumination emitting region 212a.

If the blue light provided from first unit 100 is incident on green fluorescence emitting region 212b1, the blue light is converted to green light by the green phosphor in green fluorescence emitting region 212b1. This green light (monochromatic light) is emitted as light for projection from green fluorescence emitting region 212b1.

If the blue light provided from first unit 100 is incident on red fluorescence emitting region 212b2, the blue light is converted to red light by the red phosphor in red fluorescence emitting region 212b2. This red light (monochromatic light) is emitted as light for projection from red fluorescence emitting region 212b2.

If the blue light provided from first unit 100 is incident on transmission region 212T, this blue light (monochromatic light) passes through transmission region 212T without being converted. This blue light is emitted as light for projection from transmission region 212T, and then travels to first reflective mirror 231, second reflective mirror 232, third reflective mirror 233, and then dichroic mirror 220.

In the case of illumination apparatus 1, the excitation light is blue light.

The light-for-projection phosphors include: the red phosphor that performs fluorescence emission of red light when the red phosphor receives blue light; and the green phosphor that performs fluorescence emission of green light when the green phosphor receives blue light.

The light-for-projection emitting region includes: red fluorescence emitting region 212b2 provided with the above red phosphor; and green fluorescence emitting region 212b1 provided with the above green phosphor. Transmission region 212T is a region through which blue light passes.

As a result, fluorescence emitting member 210 emits the light for illumination and the light for projection (the red light, the green light, and the blue light) in the time division manner. In the case of illumination apparatus 1, sequential emission of the light for illumination (white light), the blue light, the red light, and the green light in this order is referred to as one cycle. This cycle is repeated a plurality of times to emit the light for illumination and the light for projection in the time division manner.

Here, each of the light for illumination and a part of the light for projection (green light and red light), each of which is emitted from fluorescence emitting member 210, is emitted toward dichroic mirror 220, and then reflected on dichroic mirror 220 to be guided to third unit 300. On the other hand, the other part of the light for projection (blue light) emitted from fluorescence emitting member 210 is reflected sequentially on first reflective mirror 231, second reflective mirror 232, and third reflective mirror 233, and then passes through dichroic mirror 220 to be guided to third unit 300.

As described above, fluorescence emitting member 210 (phosphor wheel) is rotated to sequentially produce the light for projection and the light for illumination. Then, the light for projection and the light for illumination which are produced by fluorescence emitting member 210 are provided to third unit 300 in the time division manner (in other words, by separating the light for projection and the light for illumination into different time segments).

It should be noted that, in illumination apparatus 1, the light for projection and the light for illumination are emitted in the time division manner, but in this case, the light for projection (red light, green light, and blue light) and the light for illumination are sequentially emitted at a speed higher than a speed that human eyes can perceive. For example, the sequential emission is performed at a speed of microsecond (μsec) level. At a speed of a microsecond order, although a light color is changed to another light color, human eyes cannot perceive the color changing due to such a high speed. Therefore, human eyes perceive the changing lights as synthesized color or image.

Each of the light for projection and the light for illumination, which are provided to third unit 300, travels through condenser lens 310, rod integrator 320, and lens group 330 to be incident on display element 350. The light for projection is further produced as predetermined projection light (image) according to image signal issued from control unit 400, and eventually outputted from display element 350. The light for illumination is further produced as predetermined illumination light according to image signal issued from control unit 400, and eventually outputted from display element 350.

Then, each of the projection light and the illumination light, which is outputted from display element 350, is outputted to the outside through projection lens 340, and then incident on a predetermined incident region.

In other words, the illumination light and the projection light are outputted from third unit 300 to the outside in the time division manner, and then incident on an incident region outside illumination apparatus 1 in the time division manner. In this case, for example, the illumination light and the projection light are outputted on the same incident region in the time division manner, thereby displaying image in the incident region. Furthermore, since the illumination light and the projection light are alternately outputted, it is possible to alternately switch between illumination and image display.

[Effects of Illumination Apparatus]

As described previously, since projection light and illumination light have different aims, different light spectra are required for the projection light and the illumination light.

Figure 3:
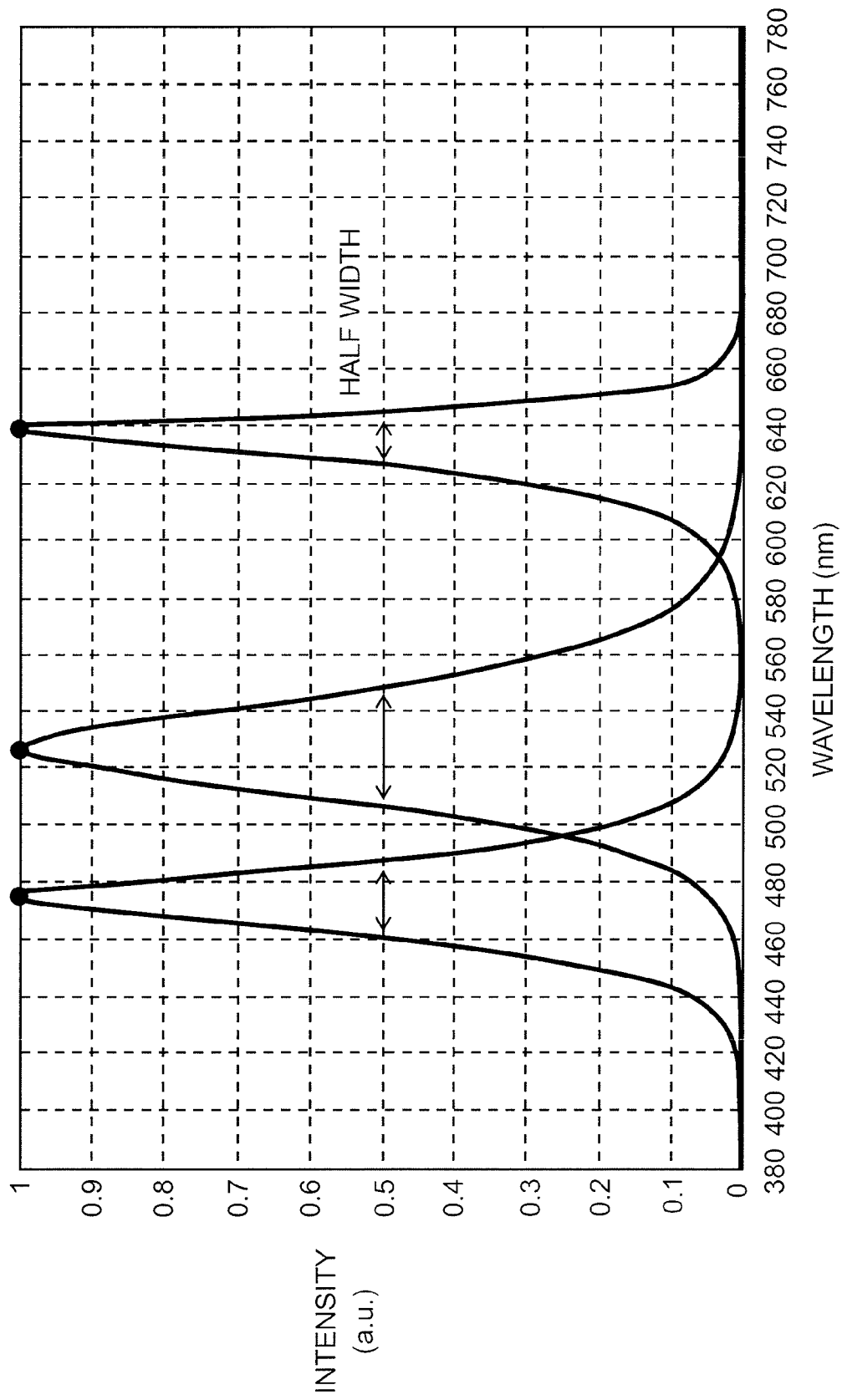
FIG. 3 is graph plotting an example of spectra of ideal projection light for RGB (Red-Green-Blue) color image.

Projection light is aimed at improving a color reproduction capability (image quality). Therefore, for example, in the case of projection light for color image, the projection light ideally has a spectrum with a sharp peak wavelength for each color in RGB as seen in FIG. 3. FIG. 3 is graph plotting an example of spectra of ideal projection light for RGB color image.

Figure 4:
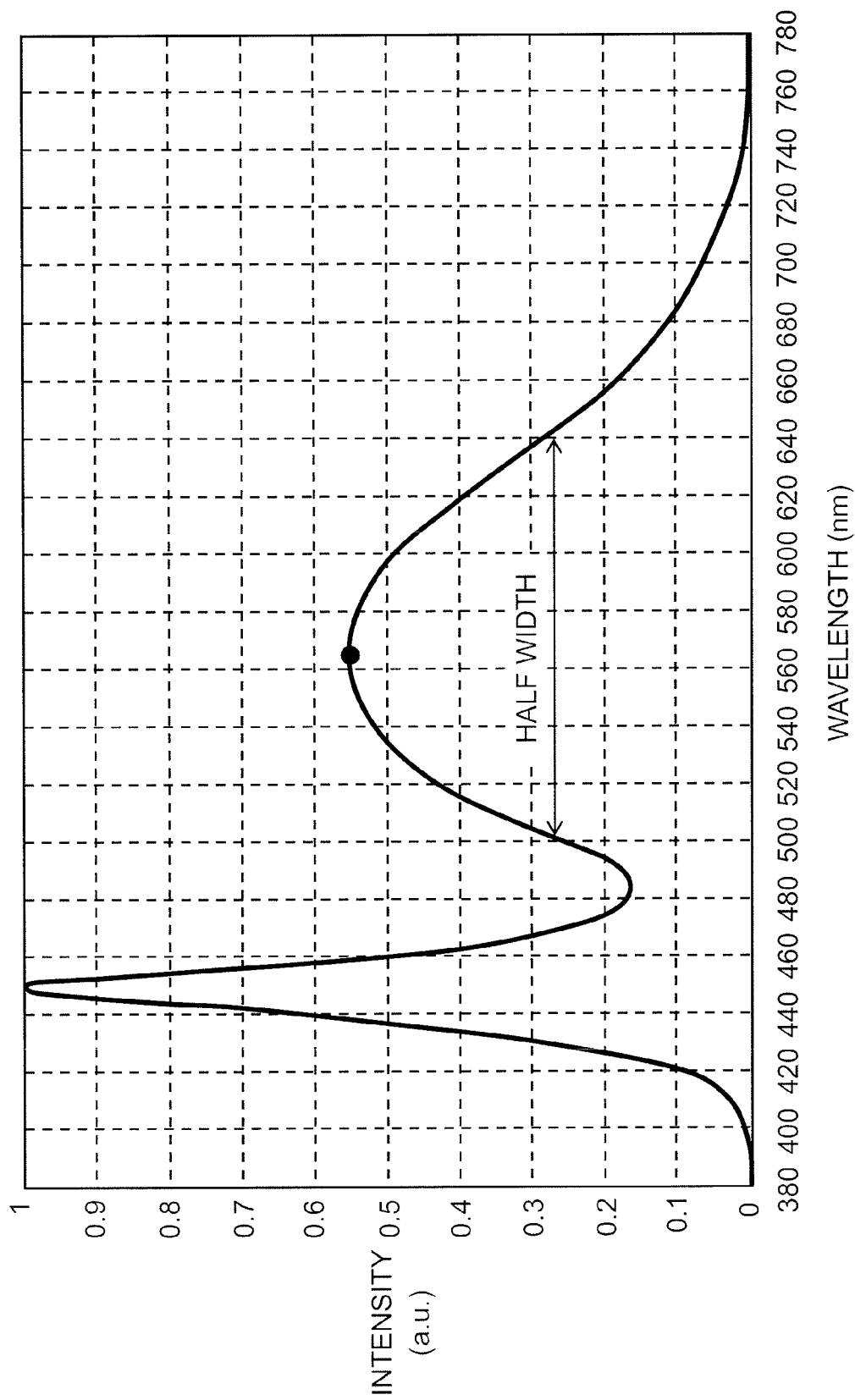
FIG. 4 is a graph plotting an example of a spectrum of ideal blue-yellow-based illumination light.

On the other hand, illumination light is aimed at improving appearance of an illuminated object, such as color rendering properties. Therefore, for example, in the case of white illumination light for illumination which is made of blue light and yellow light, the white illumination light ideally has a broad spectrum as seen in FIG. 4. FIG. 4 is a graph plotting an example of a spectrum of ideal blue-yellow-based illumination light.

In other words, when the spectrum of the illumination light having the high color rendering properties is compared to the spectrum of the projection light having the high color reproduction capability, the spectrum of the illumination light having the high color rendering properties includes a peak wavelength having a half width that is greater than a half width of any peak wavelength in the spectra of the projection light. In other words, the spectrum of the illumination light includes a peak wavelength having a half width that is greater than a half width of a peak wavelength in the projection light (red light, green light, and blue light). For example, the half width of the broad peak wavelength of such illumination light is preferably equal to or more than double of a half width of a peak wavelength of the light for projection.

In illumination apparatus 1, second unit 200 uses excitation light provided from first unit 100 to perform fluorescence emission to produce light for illumination, and third unit 300 guides the light for illumination produced in second unit 200 to the outside as predetermined illumination light. It is therefore possible to output illumination light with high color rendering properties.

In addition, in illumination apparatus 1, second unit 200 produces light for projection, and third unit 300 guides the light for projection produced in second unit 200 to the outside as predetermined projection light. It is therefore possible to output desired projection light.

Since the light for illumination and the light for projection are produced in second unit 200 in the time division manner, third unit 300 produces the illumination light and the projection light in the time division manner and outputs the illumination light and the projection light to the outside. The illumination light and the projection light are outputted in the time division manner. In other words, switching between the illumination light and the projection light to be outputted is performed at a speed higher than a speed that user's eyes can perceive. As a result, the user can perceive the illumination light and the projection light as if the illumination light and the projection light were outputted at the same time. It is also possible to cause the user to perceive the illumination light and the projection light as being alternately switched to be outputted.

As described above, illumination apparatus 1 is capable of outputting illumination light with high color rendering properties and desired projection light in the time division manner. In other words, it is possible to perform illumination with high color rendering properties and desired image display.

Moreover, in illumination apparatus 1, single fluorescence emitting member 210 (phosphor wheel) are divided to regions in the rotation direction of fluorescence emitting member 210, and thereby light-for-illumination emitting region 212*a* provided with the light-for-illumination phosphor and light-for-projection emitting region 212*b* provided with the light-for-projection phosphors are allocated to the divided regions.

As a result, illumination light with high color rendering properties and desired projection light are outputted in the time division manner. It is therefore possible to easily output illumination image in which the illumination light and the projection light seem combined with each other.

Furthermore, in illumination apparatus 1, since fluorescence emitting member 210 is rotating, an incident position of excitation light is constantly changing in light-for-illumination emitting region 212*a* and light-for-projection emitting region 212*b*. It is therefore possible to suppress temperature increase caused by absorption of the excitation light into the light-for-illumination phosphor in light-for-illumination emitting region 212*a* and the light-for-projection phosphors in light-for-projection emitting region 212*b*. As a result, it is possible to suppress decrease of light emitting efficiency of the light-for-illumination phosphor and the light-for-projection phosphors which is caused by the temperature increase.

(Variation of First Embodiment)

Figure 5:
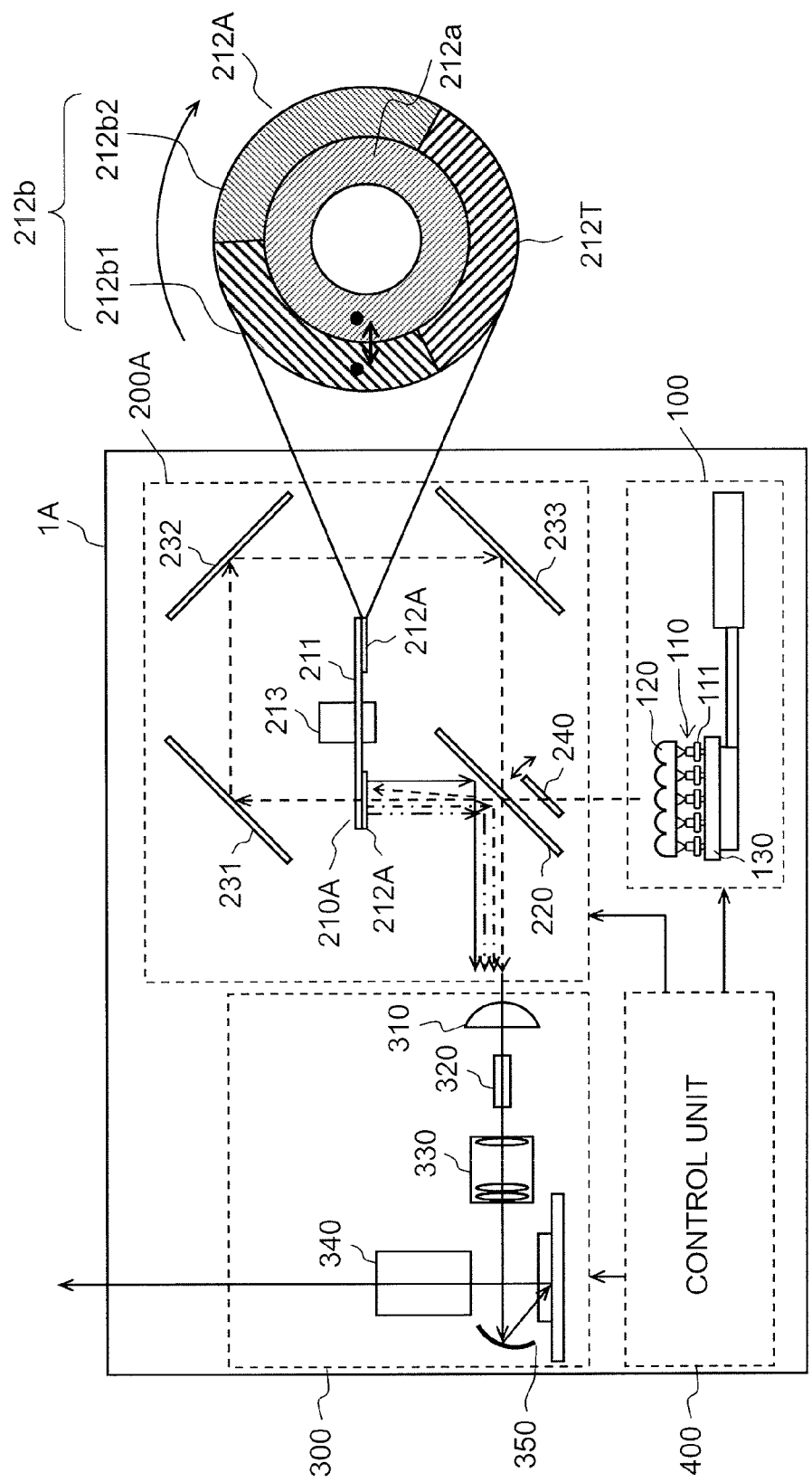
FIG. 5 is a diagram illustrating a structure of an illumination apparatus according to a variation of the first embodiment.

Next, illumination apparatus 1A according to a variation of the first embodiment of the present disclosure is described with reference to FIG. 5. FIG. 5 is a diagram illustrating a structure of illumination apparatus 1A.

Illumination apparatus 1A differs from illumination apparatus 1 in a structure of second unit 200A.

More specifically, in illumination apparatus 1, fluorescent emitting part 212 of fluorescence emitting member 210 is divided to regions only in the rotation direction of rotating plate 211. To the divided regions, light-for-illumination emitting region 212a and light-for-projection emitting region 212b are allocated.

In contrast, in illumination apparatus 1A, as illustrated in FIG. 5, fluorescent emitting part 212A of fluorescence emitting member 210A is divided concentrically in a radial direction of rotating plate 211, and light-for-illumination emitting region 212a and light-for-projection emitting region 212b are allocated to the divided regions.

More specifically, fluorescent emitting part 212A of fluorescence emitting member 210A is concentrically divided to two regions in the radial direction of rotating plate 211. To the internal region among the two regions, light-for-illumination emitting region 212a provided with the light-for-illumination phosphor is allocated. To the external region among the two regions, light-for-projection emitting region 212b provided with the light-for-projection phosphors and transmission region 212T are allocated. It should be noted that the external region is further divided to three regions in the rotation direction of rotating plate 211. Green fluorescence emitting region 212b1 and red fluorescence emitting region 212b2 in light-for-projection emitting region 212b and transmission region 212T are allocated to the three regions in the rotation direction.

Moreover, second unit 200A further includes light path switching member 240 that switches between: a light path of the excitation light provided from first unit 100 to cause the excitation light to be incident on the internal region: and a light path of the excitation light provided from first unit 100 to cause the excitation light to be incident on the external region. The internal region includes light-for-illumination emitting region 212a provided with the light-for-illumination phosphor, and the external region includes light-for-projection emitting region 212b provided with the light-for-projection phosphors.

Such light path switching member 240 is, for example, a galvano mirror. By controlling light path switching member 240 according to control signal issued from control unit 400, the light path of the excitation light of first unit 100 is temporally switched to cause the excitation light to be incident on one of the internal region (light-for-illumination emitting region 212a) and the external region (light-for-projection emitting region 212b and transmission region 212T). More specifically, control unit 400 controls an angle of the galvano mirror.

It should be noted that, like illumination apparatus 1, illumination apparatus 1A also produces light for illumination and light for projection in fluorescence emitting member 210A, and outputs the light for illumination and the light for projection from second unit 200A to third unit 300.

As described above, like illumination apparatus 1, illumination apparatus 1A is also capable of outputting illumination light with high color rendering properties and desired projection light to the outside in a time division manner.

Furthermore, in illumination apparatus 1A, the light-for-illumination phosphor and the light-for-projection phosphors are in the different regions which are obtained by concentrically dividing rotating plate 211 in the radial direction of rotating plate 211. Moreover, the light path of the excitation light of first unit 100 is switched by light path switching member 240 to cause the excitation light to be incident on the light-for-illumination phosphor and the light-for-projection phosphors in the time division manner.

As a result, the light for illumination and the light for projection are not synthesized in the rotation direction of rotating plate 211. In other words, it is possible to produce the projection light and the illumination light, which are outputted from illumination apparatus 1A, to be separate from each other. In comparison to illumination apparatus 1, illumination apparatus 1A is thereby capable of further improving image quality of the projection light (image) and further increasing brightness of the illumination light.

It should be noted that, in illumination apparatus 1A, among the two regions which are obtained by concentrically dividing rotating plate 211 in the radial direction of rotating plate 211, the internal region and the external region are allocated with light-for-illumination emitting region 212a and light-for-projection emitting region 212b, respectively, but may be allocated with vice versa.

Second Embodiment

Figure 6:
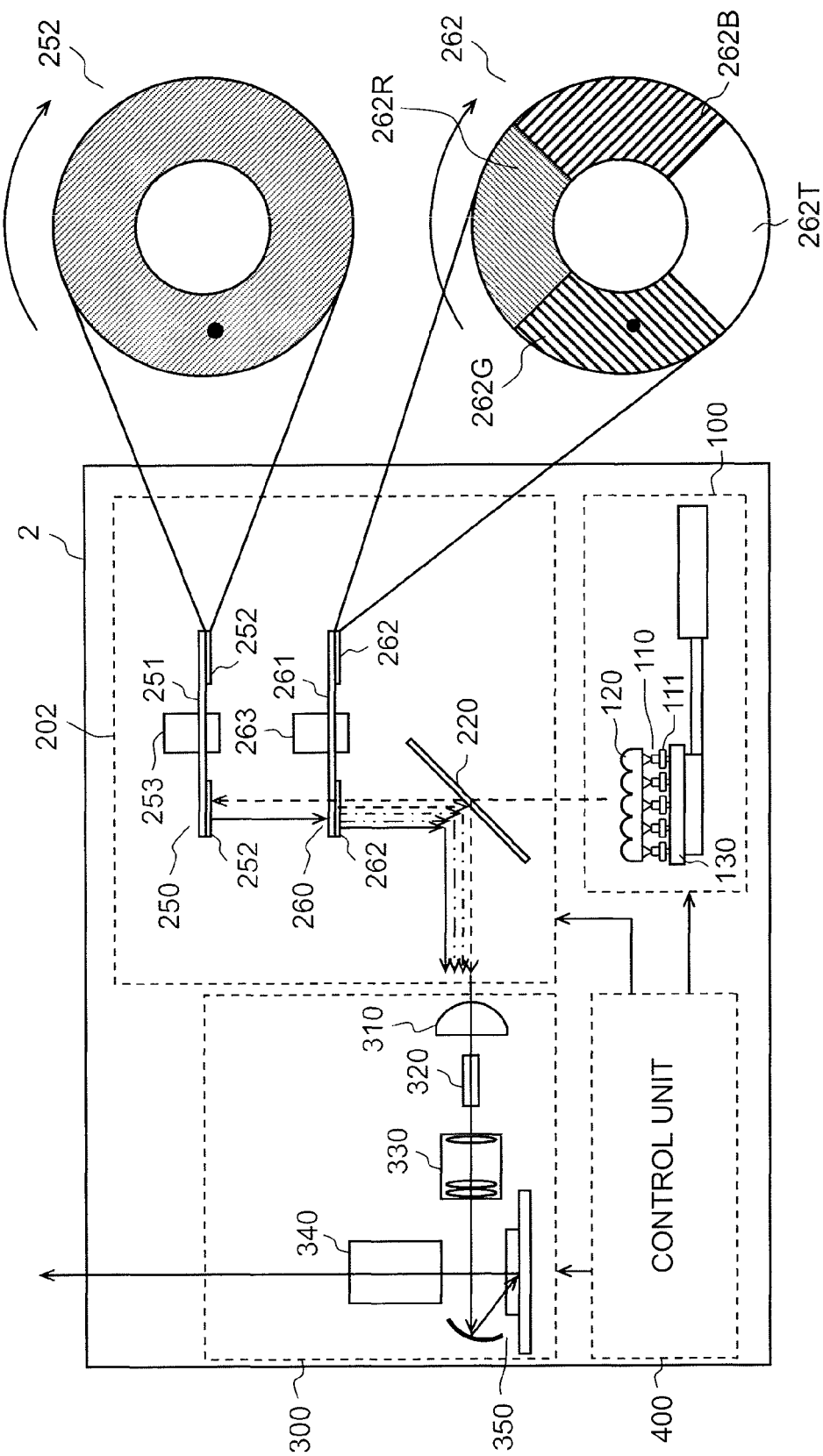
FIG. 6 is a diagram illustrating a structure of an illumination apparatus according to a second embodiment.

Next, illumination apparatus 2 according to the second embodiment of the present disclosure is described with reference to FIG. 6. FIG. 6 is a diagram illustrating a structure of illumination apparatus 2.

Illumination apparatus 2 differs from illumination apparatus 1according to the above first embodiment in a structure of second unit 202. The other structure is the same as the structure of illumination apparatus 1.

Like illumination apparatus 1, illumination apparatus 2 includes second unit 202 that is a light-for-projection/light-for-illumination production unit that produces light for projection and light for illumination and outputs the light for projection and the light for illumination in a time division manner. Second unit 202 includes dichroic mirror 220, fluorescence emitting member 250, and color selection member 260.

Fluorescence emitting member 250 is a rotatable phosphor wheel (rotating wheel), and includes rotating plate 251 having a doughnut disc shape (torus shape), fluorescent emitting part 252 provided to rotating plate 251, and motor 253 that rotates rotating plate 251. Fluorescent emitting part 252 rotates in conjunction with the rotation of rotating plate 251, and thereby emits light for illumination. Furthermore, this structure is capable of suppressing decrease of light emitting efficiency of the light-for-illumination phosphor and the light-for-projection phosphors which is caused by the previously-described temperature increase.

Rotating plate 251 is, for example, a transparent substrate. Rotating plate 251 is rotated at a predetermined frequency by motor 253. Motor 253 is driven according to drive control signal issued from control unit 400.

Fluorescent emitting part 252 is provided on one surface of rotating plate 251. Fluorescent emitting part 252 includes a phosphor which performs fluorescence emission when the phosphor receives the excitation light from first unit 100. More specifically, fluorescent emitting part 252 includes a light-for-illumination phosphor which performs fluorescence emission when the light-for-illumination phosphor receives the excitation light from first unit 100, thereby producing light for illumination.

A substance for the light-for-illumination phosphor is the same as the substance for the light-for-illumination phosphor in illumination apparatus 1. For example, if the excitation light of first unit 100 is blue light, an YAG yellow phosphor may be used to produce white illumination light (white light). More specifically, a phosphor-including member, which comprises a transparent substance including the light-for-illumination phosphor, is provided to the entire area of one surface of rotating plate 251. As described above, since yellow light that is fluorescence emission caused by blue light is used to produce white light, fluorescence emitting member 250 emits white light having a broad spectrum that is suitable for light for illumination.

Color selection member 260 is a rotating wheel, and includes rotating plate 261 having a doughnut disc shape (torus shape), color selection part 262 provided to rotating plate 261, and motor 263 that rotates rotating plate 261. Rotating plate 261 is, for example, a transparent substrate. Rotating plate 261 is rotated at predetermined frequency by motor 263. Motor 263 is driven according to drive control signal issued from control unit 400.

Color selection part 262 includes a color filter part that selectively allows light of a predetermined color included in the light for illumination which is produced by fluorescent emitting part 252, to pass through the color filter part. The color filter part has the structure of selectively allowing light traveling from fluorescence emitting member 250 toward dichroic mirror 220 to pass through the color filter part. According to the present embodiment, the color filter part includes red filter 262R, green filter 262G, and blue filter 262B. Red filter 262R selectively allows red light included in the light for illumination produced by fluorescence emitting member 250 (fluorescent emitting part 252) to pass through red filter 262R. Green filter 262G selectively allows green light included in the light for illumination to pass through green filter 262G. Blue filter 262B selectively allows blue light included in the light for illumination to pass through blue filter 262B.

It should be noted that red filter 262R, green filter 262G, and blue filter 262B are dichroic filters, and allow excitation light (blue light) traveling from first unit 100 toward fluorescence emitting member 250 to path through the respective filters.

Furthermore, color selection member 260 includes transmission part 262T that allows all colors included in the light for illumination produced by fluorescent emitting part 252 to pass through transmission part 262T.

The color filter part and transmission part 262T are provided in respective predetermined regions which are obtained by dividing rotating plate 261 in a rotation direction of color selection member 260. More specifically, red filter 262R, green filter 262G, blue filter 262B, and transmission part 262T are provided in respective four regions which are obtained by dividing rotating plate 261 in the rotation direction of color selection member 260.

The rotation of rotating plate 261 caused by motor 263 allows the light for illumination emitted from fluorescence emitting member 250 to pass through the color filter part (red filter 262R, green filter 262G, and blue filter 262B) and transmission part 262T in the time division manner so as to be emitted, in the time division manner, from color selection member 260 as the light for projection (red light, green light, and blue light) and light for illumination.

Color selection member 260 operates in synchronization with display element 350. More specifically, according to control signal issued from control unit 400, the move of the micromirrors in display element 350 (DMD) and the rotation of color selection member 260 (rotating wheel) are controlled to be performed in synchronization with each other. Furthermore, color selection member 260 rotates in synchronization with the rotation of fluorescence emitting member 250.

Next, operations of illumination apparatus 2 are described. It should be noted that the following description is given mainly for differences from illumination apparatus 1 according to the first embodiment.

The blue light outputted from first unit 100 is provided to second unit 202, and then passes through dichroic mirror 220 and color selection member 260 to be incident on fluorescence emitting member 250. As a result, fluorescence emitting member 250 emits white light. The white light emitted from fluorescence emitting member 250 is incident on color selection member 260.

Here, since color selection member 260 is rotating, the white light emitted from fluorescence emitting member 250 is incident on the color filter part (red filter 262R, green filter 262G, blue filter 262B) and transmission part 262T in the time division manner.

If the white light of fluorescence emitting member 250 is incident on red filter 262R, only red light in the white light passes through red filter 262R to be outputted as light for projection. Likewise, if the white light of fluorescence emitting member 250 is incident on green filter 262G, only green light in the white light passes through green filter 262G to be outputted as light for projection. Likewise, if the white light of fluorescence emitting member 250 is incident on blue filter 262B, only blue light in the white light passes through blue filter 262B to be outputted as light for projection.

Furthermore, if the white light of fluorescence emitting member 250 is incident on transmission part 262T, all the white light passes through transmission part 262T to be outputted as light for illumination.

The color filter part in color selection part 262 includes: red filter 262R that selectively allows red light included in the light for illumination to pass through red filter 262R; green filter 262G that selectively allows green light included in the light for illumination to pass through green filter 262G; and blue filter 262B that selectively allows blue light included in the light for illumination to pass through blue filter 262B. Red filter 262R, green filter 262G, and blue filter 262B are provided in the respective regions which are obtained by dividing rotating plate 261 in the rotation direction of color selection member 260.

As a result, as color selection member 260 rotates, the light for illumination and the light for projection (the red light, the green light, and the blue light) are emitted from color selection member 260 in the time division manner. In other words, also in the case of illumination apparatus 2, sequential emission of the light for illumination (white light), the blue light, the red light, and the green light in this order from second unit 202 is referred to as one cycle. This cycle is repeated a plurality of times to emit the light for illumination and the light for projection in the time division manner.

As described above, in illumination apparatus 2, by rotating color selection member 260, the light for projection and the light for illumination are sequentially produced and provided to third unit 300 in the time division manner.

It should be noted that, like in illumination apparatus 1, in illumination apparatus 2, the light for projection and the light for illumination which are provided to third unit 300 are guided to the outside in the time division manner as predetermined projection light and predetermined illumination light, respectively.

As described above, like illumination apparatus 1, illumination apparatus 2 is also capable of outputting illumination light with high color rendering properties and desired projection light to the outside in the time division manner.

Third Embodiment

Next, illumination apparatus 3 according to the third embodiment of the present disclosure is described with reference to FIG. 7. FIG. 7 is a diagram illustrating a structure of illumination apparatus 3.

Illumination apparatus 3 differs from illumination apparatus 1 according to the above first embodiment in a structure of second unit 203. The other structure is the same as the structure of illumination apparatus 1.

Second unit 203 is a light-for-projection/light-for-illumination production unit that produces light for projection and light for illumination. Second unit 203 includes light-for-illumination production unit 203A and light-for-projection production unit 203B as light source units. In illumination apparatus 3, light-for-illumination production unit 203A and light-for-projection production unit 203B are light source units, and light for projection and light for illumination are produced by the different light sources.

Light-for-illumination production unit 203A includes fluorescence emitting member 270 and dichroic mirror 220. Fluorescence emitting member 270 is a phosphor wheel (rotating wheel), and includes rotating plate 271 having a doughnut disc shape (torus shape), fluorescent emitting part 272 provided to rotating plate 271, and motor 273 that rotates rotating plate 271. Fluorescent emitting part 272 rotates in conjunction with the rotation of rotating plate 271, and thereby emits light for illumination.

Rotating plate 271 is, for example, a transparent substrate. Rotating plate 271 is rotated at predetermined frequency by motor 273. Motor 273 is driven according to drive control signal issued from control unit 400.

Fluorescent emitting part 272 is provided on one surface of rotating plate 271. Fluorescent emitting part 272 includes phosphors each of which performs fluorescence emission when the phosphor receives excitation light from first unit 100. Fluorescent emitting part 272 includes a light-for-illumination phosphor which performs fluorescence emission when the light-for-illumination phosphor receives the excitation light from first unit 100, thereby producing light for illumination.

Fluorescent emitting part 272 includes first light-for-illumination emitting region 272A and second light-for-illumination emitting region 272B. First light-for-illumination emitting region 272A emits the first light for illumination (illumination light A) by fluorescence emission of a phosphor. Second light-for-illumination emitting region 272B emits the second light for illumination (illumination light B) by fluorescence emission of a different phosphor. The first light for illumination and the second light for illumination have different colors. In other words, fluorescence emitting member 270 produces plural kinds of light for illumination having different colors. Examples of the above plural kinds of light for illumination include white light, such as light of a daylight white color, light of a daylight color, and light of a bulb color, and also colored light, such as red light. As one example, the first light for illumination has a daylight color, and the second light for illumination has a bulb color.

First light-for-illumination emitting region 272A includes a first light-for-illumination phosphor that performs fluorescence emission when the a first light-for-illumination phosphor receives the excitation light from first unit 100. Second light-for-illumination emitting region 272B includes a second light-for-illumination phosphor that performs fluorescence emission when the second light-for-illumination phosphor receives the excitation light from first unit 100.

First light-for-illumination emitting region 272A and second light-for-illumination emitting region 272B are allocated to respective predetermined regions of which are obtained by dividing rotating plate 271 in a rotation direction of rotating plate 271. It should be noted that an area of first light-for-illumination emitting region 272A is set to be larger than an area of second light-for-illumination emitting region 272B.

It is possible to choose a substance for the first light-for-illumination phosphor and a substance for the second light-for-illumination phosphor according to the excitation light of first unit 100 so as to produce plural kinds of illumination light of different desired colors. The respective substances are chosen so that the first light for illumination and the second light for illumination have different colors.

For example, if the excitation light of first unit 100 is blue light, the substance for the first light-for-illumination phosphor and the substance for the second light-for-illumination phosphor are, for example, different combinations of an YAG yellow phosphor with a red or green phosphor, thereby producing different kinds of white illumination light having different color temperatures (among daylight white color, daylight color, bulb color, and the like). More specifically, a phosphor-including member, which comprises a transparent substance including a corresponding one of the light-for-illumination phosphors, is provided to one surface of rotating plate 271 for each of first light-for-illumination emitting region 272A and second light-for-illumination emitting region 272B. As described above, also in illumination apparatus 3, yellow light that is fluorescence emission caused by blue light is used to produce white light. Therefore, fluorescence emitting member 270 emits white light having a broad spectrum that is appropriate for light for illumination.

Light-for-projection production unit 203B includes light source unit 280 that emits light for projection. Light source unit 280 includes: red light source 280R that emits red light; green light source 280G that emits green light; and blue light source 280B that emits blue light. Red light source 280R, green light source 280G, and blue light source 280B may be, for example, semiconductor light emitting elements, such as semiconductor lasers or LEDs. In illumination apparatus 3, semiconductor lasers are used.

Each of the red light emitted from red light source 280R, the green light emitted from green light source 280G, the blue light emitted from blue light source 280B is guided as light for projection to third unit 300. It should be noted that, in second unit 203, each of the red light, the green light, and the blue light, which are provided from light source unit 280, is guided to third unit 300 along the same light path as the light path of the first light for illumination and the second light for illumination which are provided from fluorescence emitting member 270.

Next, operations of illumination apparatus 3 are described. It should be noted that the following description is given mainly for differences from illumination apparatus 1 according to the first embodiment.

Blue light outputted from first unit 100 is provided to light-for-illumination production unit 203A in second unit 203, and passes through dichroic mirror 220 to be incident on fluorescence emitting member 270.

Here, if the excitation light of first unit 100 is incident on first light-for-illumination emitting region 272A, the excitation light causes the first light-for-illumination phosphor in first light-for-illumination emitting region 272A to perform fluorescence emission to emit the first light for illumination.

On the other hand, if the excitation light of first unit 100 is incident on second light-for-illumination emitting region 272B, the excitation light causes the second light-for-illumination phosphor in second light-for-illumination emitting region 272B to perform fluorescence emission to emit the second light for illumination.

Each of the first light for illumination and the second light for illumination which are outputted from light-for-illumination production unit 203A is reflected on dichroic mirror 220 to be guided to third unit 300.

On the other hand, in light-for-projection production unit 203B in second unit 203, each of red light, green light, and blue light is produced in light source unit 280, and outputted from light-for-projection production unit 203B. Each of the red light, the green light, and the blue light, which are produced in light-for-projection production unit 203B, is provided to third unit 300 as light for projection.

Here, as light-for-illumination production unit 203A and light-for-projection production unit 203B are different devices, the first or second light for illumination and the light for projection are outputted respectively and independently from the respective different devices. However, light-for-illumination production unit 203A and light-for-projection production unit 203B are controlled by control unit 400 to operate in synchronization with each other.

Therefore, the first or second light for illumination and the light for projection are temporally added in second unit 203 and then provided to third unit 300. More specifically, when one of light-for-illumination production unit 203A and light-for-projection production unit 203B outputs light, the other one does not output light. The first or second light for illumination and the light for projection are outputted in a time division manner in synchronization with each other to be guided to third unit 300.

It should be noted that, like in illumination apparatus 1, in illumination apparatus 3, the first or second light for illumination and the light for projection which are provided to third unit 300 are guided to the outside in the time division manner as predetermined illumination light and predetermined projection light, respectively.

As described above, like illumination apparatus 1, illumination apparatus 3 is also capable of outputting illumination light with high color rendering properties and desired projection light to the outside in the time division manner.

Furthermore, since light-for-illumination production unit 203A and light-for-projection production unit 203B are different devices, the light for illumination and the light for projection are not synthesized with each other. In comparison to illumination apparatus 1, illumination apparatus 3 is thereby capable of further improving image quality of the projection light (image) and further increasing brightness of the illumination light.

Moreover, fluorescence emitting member 270 produces plural kinds of light for illumination having different colors. It is therefore possible to switch between the plural kinds of illumination light depending on purpose and output the switched illumination light, thereby producing various kinds of illumination light for various situations. For example, it is possible to switch between plural kinds of illumination light to be outputted depending on whether to mainly illuminate fresh food such as fish, meat, and vegetables, or to mainly illuminate human skin.

It has been described above that the first light for illumination and the second light for illumination (plural kinds of light for illumination having different colors) are produced. However, it is also possible to produce either the first light for illumination or the second light for illumination, in other words, one kind of light for illumination.

(Other Variations etc.)

Although the illumination apparatus according to the present disclosure is described above with reference to illumination apparatuses 1, 1A, 2, and 3, the present disclosure is not limited to the above-described embodiments and variation.

For example, in each of illumination apparatuses 1, 1A, and 2, fluorescence emitting member 210 or 210A or color selection member 260 includes transmission region 212T or transmission part 262T that allows the excitation light to pass through it. However, transmission region 212T or transmission part 262T may be replaced by a blue fluorescence emitting region provided with a blue phosphor that performs fluorescence emission of blue light when the blue phosphor receives the excitation light.

Furthermore, in each of illumination apparatuses 1, 1A, 2, and 3, the excitation light produced in first unit 100 is blue light. However, the excitation light is not limited to this. For example, the excitation light produced in first unit 100 may be ultraviolet light (UV light). In this case, transmission region 212T of fluorescence emitting member 210 or 210A or transmission part 262T of color selection member 260 may be replaced by a blue fluorescence emitting region provided with a blue phosphor that performs fluorescence emission to emit blue light when the blue phosphor receives ultraviolet light. In this case, dichroic mirror 220 may have properties of allowing ultraviolet light to pass through dichroic mirror 220 but reflecting light (visible light) having a wavelength longer than a wavelength of ultraviolet light.

In each of illumination apparatuses 1, 1A, 2, and 3, the fluorescence emitting member is rotated to emit light for illumination and light for projection in the time division manner. However, as another method of emitting light in the time division manner, for example, it is possible to use a light path switching member to cause light for projection and light for illumination to be emitted in the time division manner without rotating the fluorescence emitting member.

In each of illumination apparatuses 1, 1A, 2, and 3, the light for illumination and the illumination light are white light (synthetic light). However, the light for illumination and the illumination light may be colored light or monochromatic light.

In each of illumination apparatuses 1, 1A, 2, and 3, first unit 100, second unit 200, 200A, 202, or 203, and third unit 300 may be appropriately added with an optical member such as a lens, a mirror, or the like.

In each of illumination apparatuses 1, 1A, 2, and 3, the light sources are semiconductor lasers or LEDs. However, the light sources may be other solid-state light emitting elements such as EL (Electro Luminescence) elements, for example, organic EL elements or inorganic EL elements.

Various modifications of the embodiments and the variations which those skilled in the art can conceive or desirable combinations of the structural elements and the functions in the embodiments and the variations without materially departing from the novel teachings and advantages of the present disclosure are also included in the present disclosure.

What is claimed is:
1. An illumination apparatus comprising:
a first unit including an excitation light source that produces excitation light;

a second unit including a light-for-illumination phosphor and a light-for-projection phosphor, the second unit being configured to produce and output light for illumination and to produce and output light for projection when the light-for-illumination phosphor receives the excitation light, the light for illumination and the light for projection being output in a time division manner; and a third unit including a light shaper, the third unit being configured to shape the light for illumination by the light shaper and to guide the shaped light for illumination outside as illumination light, and to shape the light for projection by the light shaping member and to guide the shaped light for projection outside as projection light, wherein, the second unit further includes a dichroic mirror, the dichroic mirror allowing the excitation light from the first unit to pass through the dichromic mirror, and also reflecting light having a wavelength longer than a wavelength of the excitation light from the first unit, the produced light for illumination and the produced light for projection are emitted toward the dichromic mirror, and then reflected on the dichromic mirror to be guided to the third unit, and switching between the illumination light and the projection light to be output is performed at a speed higher than a speed that a user's eyes can perceive.

2. The illumination apparatus according to claim 1, wherein the second unit further includes a fluorescence emitter that includes the light-for-illumination phosphor.

3. The illumination apparatus according to claim 2, wherein the fluorescence emitter further includes the light-for-projection phosphor.

4. The illumination apparatus according to claim 3, wherein the fluorescence emitter is a phosphor wheel having a rotating plate, the light-for-illumination phosphor and the light-for-projection phosphor are respectively provided at different positions on the rotating plate, and the excitation light is incident on the light-for-illumination phosphor and the light-for-projection phosphor in the time division manner.

5. The illumination apparatus according to claim 4, wherein the rotating plate includes: a light-for-illumination emitting region provided with the light-for-illumination phosphor; a light-for-projection emitting region provided with the light-for-projection phosphor; and a transmission region through which the excitation light passes.

6. The illumination apparatus according to claim 5, wherein the excitation light is blue light, the light-for-projection phosphor includes a red phosphor and a green phosphor, the red phosphor performing fluorescence emission of red light when the red phosphor receives the blue light, and the green phosphor performing fluorescence emission of green light when the green phosphor receives the blue light, and the light-for-projection emitting region includes a red fluorescence emitting region and a green fluorescence emitting region, the red fluorescence emitting region being provided with the red phosphor, and the green fluorescence emitting region being provided with the green phosphor.

7. The illumination apparatus according to claim 4, wherein the light-for-illumination phosphor and the light-for-projection phosphor are provided in regions which are obtained by dividing the rotating plate in a rotation direction of the rotating plate.

8. The illumination apparatus according to claim 4, wherein the light-for-illumination phosphor and the light-for-projection phosphor are provided in regions which are obtained by concentrically dividing the rotating plate in a radial direction of the rotating plate.

9. The illumination apparatus according to claim 8, wherein the second unit further includes a light path switcher that switches between: a light path of the excitation light to cause the excitation light to be incident on the light-for-illumination phosphor; and a light path of the excitation light to cause the excitation light to be incident on the light-for-projection phosphor.

10. The illumination apparatus according to claim 2, wherein the second unit further includes a color selector, the color selector having a color filter portion and a transmission portion, the color filter portion selectively allowing light of a predetermined color, included in the light for illumination, which is produced by the fluorescence emitting member, to pass through the color filter portion, and the transmission portion allowing the light for illumination to pass through the transmission portion.

11. The illumination apparatus according to claim 10, wherein the fluorescence emitting member is a phosphor wheel having a rotating plate, and the color selector rotates in synchronization with the phosphor wheel.

12. The illumination apparatus according to claim 11, wherein the color filter portion and the transmission portion are provided in regions which are obtained by dividing the color selection member in the rotation direction of the color selection member.

13. The illumination apparatus according to claim 12, wherein the color filter portion includes a red filter, a green filter, and a blue filter, the red filter selectively allowing red light included in the light for illumination to pass through the red filter, the green filter selectively allowing green light included in the light for illumination to pass through the green filter, and the blue filter selectively allowing blue light included in the light for illumination to pass through the blue filter, and the red filter, the green filter, and the blue filter are provided in the regions which are obtained by dividing the color selection member in the rotation direction of the color selection member.

14. The illumination apparatus according to claim 1, wherein the second unit further includes a light source that emits the light for projection.

15. The illumination apparatus according to claim 14, wherein the light source includes: a red light source that emits red light; a green light source that emits green light; and a blue light source that emits blue light, and each of the red light, the green light, and the blue light is guided to the third unit as the light for projection.

16. The illumination apparatus according to claim 2, wherein the fluorescence emitter produces plural kinds of the light for illumination having different colors.

17. The illumination apparatus according to claim 1, wherein a spectrum of the illumination light includes a peak wavelength having a half width that is greater than a half width of a peak wavelength in a spectrum of the projection light.

18. The illumination apparatus according to claim 1, wherein the light for illumination is incident on a predetermined region external to the illumination apparatus and improves color rendering properties of an illuminated object.

19. The illumination apparatus according to claim 1, wherein the light for projection is displayed on a predetermined region external of the illumination apparatus and improves color reproduction capability.

* * * * *